United States Patent
Jayaram

(10) Patent No.: US 9,306,989 B1
(45) Date of Patent: Apr. 5, 2016

(54) LINKING SOCIAL MEDIA AND BROADCAST MEDIA

(71) Applicant: Ranjith Jayaram, San Jose, CA (US)

(72) Inventor: Ranjith Jayaram, San Jose, CA (US)

(73) Assignee: GOOGLE INC., Mountain View, CA (US)

(*) Notice: Subject to any disclaimer, the term of this patent is extended or adjusted under 35 U.S.C. 154(b) by 375 days.

(21) Appl. No.: 13/653,356

(22) Filed: Oct. 16, 2012

(51) Int. Cl.
| G06F 3/00 | (2006.01) |
| H04L 29/06 | (2006.01) |
| H04N 21/4788 | (2011.01) |
| H04N 21/8547 | (2011.01) |
| H04N 21/44 | (2011.01) |

(52) U.S. Cl.
CPC ........ *H04L 65/403* (2013.01); *H04N 21/44008* (2013.01); *H04N 21/4788* (2013.01); *H04N 21/8547* (2013.01)

(58) Field of Classification Search
CPC .... H04L 12/588; H04L 65/403; G06Q 50/01; H04N 21/4788; H04N 21/4126; H04N 21/8547; H04N 21/44008; H04N 21/4722; H04N 5/403; H04N 5/44582; H04N 5/4403
USPC ........... 715/716, 719, 720, 751, 753; 709/204
See application file for complete search history.

(56) References Cited

U.S. PATENT DOCUMENTS

| 5,751,378 | A | 5/1998 | Chen et al. |
| 7,624,337 | B2 | 11/2009 | Sull et al. |
| 8,613,026 | B2 * | 12/2013 | Malhotra et al. ................ 725/62 |
| 2010/0242074 | A1 * | 9/2010 | Rouse et al. .................. 725/100 |
| 2010/0318520 | A1 * | 12/2010 | Loeb et al. .................... 707/743 |
| 2011/0058101 | A1 * | 3/2011 | Earley et al. .................. 348/461 |
| 2011/0154223 | A1 * | 6/2011 | Whitnah et al. ............... 715/753 |
| 2011/0215138 | A1 * | 9/2011 | Crum ............................ 235/375 |
| 2012/0008821 | A1 * | 1/2012 | Sharon et al. ................. 382/100 |
| 2012/0030587 | A1 * | 2/2012 | Ketkar .......................... 715/751 |
| 2012/0096357 | A1 * | 4/2012 | Folgner et al. ................ 715/726 |

(Continued)

OTHER PUBLICATIONS

Kim Hong, "How to: Review Tags and Posts Before They Appear on Your Facebook Timeline," Jul. 2, 2012, http://seniornet.org/blog/how-to-review-tags-and-posts-before-they-appear-on-your-facebook-timeline/, pp. 1-3.*

*Primary Examiner* — Kieu Vu
*Assistant Examiner* — Asteway T Gattew
(74) *Attorney, Agent, or Firm* — Morgan, Lewis & Bockius LLP

(57) ABSTRACT

The various implementations described herein enable bridging the use of a social networking application with the viewing and listening experiences associated with broadcast media. In particular, users are enabled to share and view nuanced comments associated with media content presented on a first type of device using Internet-enabled second devices. For example, a client device is enabled to synchronize a displayable user interface with a post stream associated with a particular broadcast media program as it is airing; and to present and enable user selection and modification of one or more social network post templates associated with the particular broadcast media program in order to produce a user-specific social network post. The user-specific social network post is then transmitted to a server system. In addition to providing the social network post templates, the server system operates to publish the user-specific social network post in the appropriate post stream.

29 Claims, 12 Drawing Sheets

(56) References Cited

U.S. PATENT DOCUMENTS

| | | | |
|---|---|---|---|
| 2012/0174157 A1* | 7/2012 | Stinson et al. | 725/40 |
| 2012/0195370 A1 | 8/2012 | Guerrero | |
| 2012/0254927 A1* | 10/2012 | Kim et al. | 725/109 |
| 2012/0284343 A1* | 11/2012 | Lee et al. | 709/206 |
| 2012/0290953 A1* | 11/2012 | Russell et al. | 715/758 |
| 2012/0291059 A1* | 11/2012 | Roberts et al. | 725/25 |
| 2013/0347046 A1* | 12/2013 | Bluvband et al. | 725/109 |
| 2014/0032565 A1* | 1/2014 | Parker | 707/741 |

* cited by examiner

LINKING SOCIAL MEDIA AND BROADCAST MEDIA

TECHNICAL FIELD

The present disclosure generally relates to linking social media applications to broadcast media delivery, and in particular, to enabling users to share and view comments about broadcast media programs in real-time.

BACKGROUND

Users of Internet-enabled electronic devices, such as computers, tablets and smartphones are increasingly interested in sharing media viewing and listening experiences with others. Sharing media content is relatively straightforward when the media content is available online (e.g. streaming video, web pages, quotes from scripts, downloadable music or videos) in which case the user can simply send electronic messages with links to the media content of interest. However, it is more difficult for a user to share information about broadcast media content because such content is typically not yet available online. For example, if a viewer wants to share a quote from a TV sitcom or movie, that viewer would need to send an email, text, tweet or a social network update, or make one or many phone-calls and/or instant messages to his or her friends with the pertinent quote. It is even harder, if at all possible, for a user to send a friend a link to, or a snippet of, or a quote from broadcast media content when the content is airing due to the lack of integration between the broadcast media content (e.g. television) and whatever communication device is employed by the user to share information about the media content.

In other words, it is inefficient for users to share information related to media content they are viewing on TV (or listening to on the radio, or the like) because sharing such information currently requires users to take some action beyond the viewing experience to link the media content from one medium to another. Returning to the example above, a user attempting to share a quote from a TV sitcom on a social networking website would either have to type the quote or search for the text of the script online in order to locate the quote. Even if the text of the script is available online, cutting and pasting the online text can be cumbersome.

Reciprocally, it is difficult for a casual follower to determine the public or community opinion about a particular subject that is occurring in real-time or even after the original airing of a TV program or the like. Typically, users have to seek out various content publishers that post content about the subject, including source-synchronous and quasi-officially approved posts from producers and/or cast members. But it can be time consuming to decipher public or community opinion about the subject from ratings, articles and/or comments posted on websites or micro-blogging applications. For example, in the case of a TV program, the research involved may take longer than the duration of the TV program, which makes trying to determine public or community opinion about the TV program as it is happening a futile endeavor.

SUMMARY

Systems, methods and devices described herein enable users of Internet-enabled devices to share and view comments about broadcast media programs in real-time. As such, after considering this discussion, and particularly after reading the section entitled "Detailed Description" one will understand how the features of various implementations are used to enable users of Internet-enabled devices to share and view comments about broadcast media programs in real-time. For example, in some implementations systems, methods and devices are operable to share and view comments associated with broadcast media content presented on a first type of device using respective Internet-enabled second devices.

Some implementations include a method generating a social network post in a post stream associated with a particular broadcast media program. In some implementations, the method includes synchronizing the user interface displayed on a user device to the post stream associated with the particular broadcast media program; presenting at least one social network post template associated with the particular broadcast media program; enabling user selection of at least one of the presented social network post templates; receiving an input that is an indication of a user selection of at least one of the social network post templates; and, transmitting the indicator of the selection to a social network server for publication in the post stream associated with the particular broadcast media program.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, illustrate only certain typical features of the present disclosure and are therefore not to be considered limiting, for the description may admit to other effective features.

Figure 1:
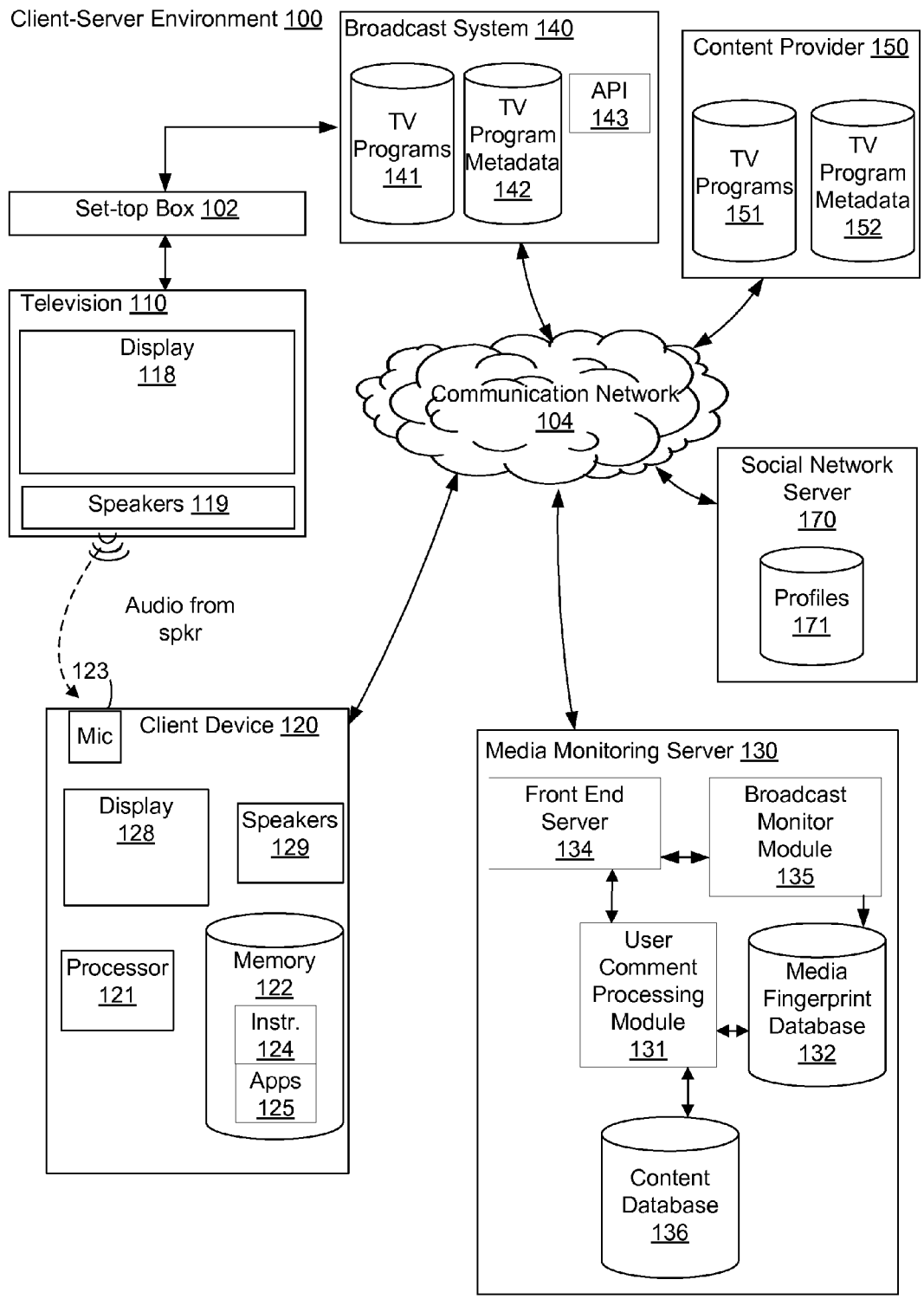
FIG. 1 is a block diagram of an example client-server environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Systems, methods and devices described herein enable users of Internet-enabled devices to share and view nuanced comments about broadcast media programs as the media programs are being aired. In other words, the various implementations enable bridging the use of a social networking application with the viewing and/or listening experiences associated with broadcast media. In particular, the various implementations are operable to enable users to share and view nuanced comments associated with broadcast media content presented on a first type of device (e.g. a TV) using respective Internet-enabled second devices (e.g. laptops, tablet computers, smartphones, etc.). For example, a client device is enabled to synchronize a displayable user interface with a post stream associated with a particular broadcast media program as it is airing. The client device is also enabled to present and facilitate user selection and modification of one or more social network post templates associated with the particular broadcast media program in order to produce a user-specific social network post. The user-specific social network post is then transmitted to a server system. In addition to providing the social network post templates, the server system operates to publish the user-specific social network post in an appropriate post stream.

Numerous details are described herein in order to provide a thorough understanding of the example implementations illustrated in the accompanying drawings. However, the invention may be practiced without these specific details. And, well-known methods, procedures, components, and circuits have not been described in exhaustive detail so as not to unnecessarily obscure more pertinent aspects of the example implementations.

FIG. 1 is a block diagram of an example implementation of a client-server environment 100. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes a set-top box 102, a television (TV) 110, a second screen client device 120 (e.g. a laptop, a tablet computer, smartphone, etc.), a communication network 104, a media monitoring server 130, a broadcast system 140, a content provider 150, and a social network server 170. The second screen client device 120, the media monitoring server 130, the broadcast system 140, the content provider 150, and the social network server 170 are capable of being connected to the communication network 104 in order to exchange information with one another and/or other devices and systems. The client-server environment 100 is merely an example provided to discuss more pertinent features of the present disclosure. Those skilled in the art will appreciate from the present disclosure that any number of such devices and/or systems may be provided in a client-server environment, and particular devices may be altogether absent.

In some implementations, the media monitoring server 130 is implemented as a single server system, while in other implementations it is implemented as a distributed system of multiple servers. Solely for convenience of explanation, the media monitoring server 130 is described below as being implemented on a single server system. Similarly, in some implementations, the social network server 170 is implemented as a single server system, while in other implementations it is implemented as a distributed system of multiple servers. Solely, for convenience of explanation, the social network server 170 is described below as being implemented on a single server system. Similarly, in some implementations, the broadcast system 140 is implemented as a single server system, while in other implementations it is implemented as a distributed system of multiple servers. Solely, for convenience of explanation, the broadcast system 140 is described below as being implemented on a single server system. Similarly, in some implementations, the content provider 150 is implemented as a single server system, while in other implementations it is implemented as a distributed system of multiple servers. Solely, for convenience of explanation, the content provider 150 is described below as being implemented on a single server system. Moreover, the functionality of the broadcast system 140 and the content provider 150 can be combined into a single server system. Additionally and/or alternatively, while only one broadcast system and only one content provider is illustrated in FIG. 1 for the sake of brevity, those skilled in the art will appreciate from the present disclosure that fewer or more of each may be present in an implementation of a client-server environment.

In some implementations, the set-top box 102 and the TV 110 are provided in combination. The set-top box 102 is configured to receive and decode signals including media content from the broadcast system or the like. In some implementations, the set-top box 102 is also Internet-enabled in order to receive signals including media content or the like. In operation, the set-top box 102 decodes the signal received from the broadcast system 140 or the like and provides audio and video content to the TV 110 for display. While a TV has been used in the illustrated example, those skilled in the art will appreciate from the present disclosure that any number of displays devices, including computers, laptop computers, tablet computers, smart-phones and the like, can be used to display a video stream and play the associated audio stream. Additionally and/or alternatively, the functions of the set-top box 102 and the TV 110 may be combined into a single device.

In some implementations, the set-top box 102 is any computer device capable of connecting to the communication network 104, receiving video streams, extracting information from video streams and presenting video streams for the display using the TV 110 (or another display device). In some implementations, the set-top box 102 may be configured as a receiver for cable TV and/or satellite TV, a digital video recorder (DVR), a digital media receiver, a TV tuner, a computer, and/or any other device that outputs TV signals. In some implementations the TV 110 can be a conventional TV display that is not connectable to the Internet and that displays digital and/or analog TV content received via over the air broadcasts or a satellite or cable connection.

As is typical of televisions, the TV 110 includes a display 118 and speakers 119. Additionally and/or alternatively, the TV 110 can be replaced with another type of display device for presenting video content to a user, such as for example, a computer, a tablet device, a mobile telephone, a projector, or other type of video display system. The display device can be coupled to the set-top box 102 via a wireless or wired connection.

As used herein, a TV signal is an electrical, optical, or other type of data transmitting medium that includes audio and/or video components corresponding to a TV channel. In some implementations, the TV signal is a terrestrial over-the-air TV broadcast signal or a sign distributed/broadcast on a cable-system or a satellite system. In some implementations, the TV signal is transmitted as data over a network connection. For example, the set-top box 102 can receive video streams from an Internet connection. Audio and video components of a TV signal are sometimes referred to herein as audio signals and video signals. In some implementations, a TV signal corresponds to a TV channel that is being displayed on the TV 110.

The second screen client device 120 may be any computer device that is capable of connecting to the communication network 104, such as a computer, a laptop computer, a tablet device, a netbook, an Internet kiosk, a personal digital assistant, a mobile phone, a gaming device, or any other device that is capable of communicating with the media monitoring server 130. In some implementations, the second screen client device 120 includes one or more processors 121, non-volatile memory 122 such as a hard disk drive, a display 128, speakers 129, and a microphone 123. The second screen client device 120 may also have input devices such as a keyboard, a mouse and/or track-pad (not shown). In some implementations, the second screen client device 120 includes a touch screen display, a digital camera and/or any number of supplemental devices to add functionality.

In some implementations, the second screen client device 120 may be connected to the set-top box 102 via a wireless or wired connection. In some implementations where such connection exists, the second screen client device 120 may optionally operate in accordance with instructions, information and/or digital content (collectively "second screen information") provided by the set-top box 102 (and vice versa). In some implementations, the set-top box 102 issues instructions to the second screen client device 120 that cause the second screen client device 120 to present on the display 128 and/or the speaker 129 digital content that is complementary, or related to, digital content that is being presented by the client 102 on the TV 110.

In some implementations, the second screen client device 120 includes a microphone 123 that enables the client device to receive sound (audio content) from, for example, the speakers 119 of the TV 110. The microphone 123 enables the second screen client device 120 to store the audio content/soundtrack that is associated with the video content as it is presented. The second screen client device 120 can store this information locally and then send to the media monitoring server 130 content information that is any one or more of: fingerprints of the stored audio content, the audio content itself, portions/snippets of the audio content, fingerprints of the portions of the audio content or references to the playing content.

In this way, the media monitoring server 130 can identify the content playing on the television even if the electronic device on which the content is being presented is not an Internet-enabled device, such as an older TV set; is not connected to the Internet (temporarily or permanently) so is unable to send the content information; or does not have the capability to record or fingerprint media information related to the video content. Such an arrangement (i.e., where the second screen client device 120 stores and sends the content information to the media monitoring server 130) allows a user to receive from the media monitoring server 130 second screen content triggered in response to the content information no matter where the user is watching TV.

In some implementations, the second screen client device 120 includes one or more applications 125 stored in the memory 122. As discussed in greater detail below, the processor 121 executes the one or more applications in accordance with a set of instructions received from the media monitoring server 130.

The communication network 104 may be any combination of wired and wireless local area network (LAN) and/or wide area network (WAN), such as an intranet, an extranet, including a portion of the Internet, or a wireless network provided by a wireless carrier. It is sufficient that the communication network 104 provides communication capability between the second screen client device 120 and the media monitoring server 130. In some implementations, the communication network 104 uses the HyperText Transport Protocol (HTTP) to transport information using the Transmission Control Protocol/Internet Protocol (TCP/IP). HTTP permits the client device 120 to access various resources available via the communication network 104. However, the various implementations described herein are not limited to the use of any particular protocol.

In some implementations, the media monitoring server 130 includes a front end server 134 that facilitates communication between the media monitoring server 130 and the communication network 104. The front end server 134 receives content information from the second screen client device 120. As described in greater detail below, in some implementations, the content information is a video stream, a portion thereof, and/or a reference to a portion thereof. A reference to a portion of a video stream may include a time indicator and/or a digital marker referencing the content of the video stream. In some implementations, the content information is derived from a video stream being presented (i.e. playing) by the combination of the TV 110 and the set-top box 102.

In some implementations, the front end server 134 is configured to send a set of instructions to the second screen client device 120. In some implementations, the front end server 134 is configured to send content files, links to content files and/or metadata associated with the content files. The term "content file" includes any document or content of any format including, but not limited to, a video file, an image file, a music file, a web page, an email message, an SMS message, a content feed, an advertisement, a coupon, a playlist or an XML document. In some implementations, the front end server 134 is configured to send or receive one or more video streams. In some implementations, the front end server 134 is configured to receive content directly from the broadcast system 140 and/or the content provider 150 over the communication network 104.

In some implementations, the media monitoring server 130 includes a broadcast monitor module 135 that is configured receive and record broadcast media programming as the broadcast media programming airs, and to create fingerprints of media content broadcast by the broadcast system 140 and/or the content provider 150. In some implementations, the media monitoring server 130 includes a fingerprint database 132 that stores content fingerprints. A content fingerprint includes any type of condensed or compact representation, or signature, of the content of a video stream and/or audio stream. In some implementations, a fingerprint may represent a clip (such as several seconds, minutes, or hours) of a video stream or audio stream. Or, a fingerprint may represent a single instant of a video stream or audio stream (e.g., a fingerprint of single frame of a video or of the audio associated with that frame of video). Furthermore, since video content may change over time, corresponding fingerprints of that video content may also change over time. In some implementations, the fingerprint database 132 is a distributed database.

In some implementations, the media monitoring server 130 includes a content database 136. In some implementations, the content database 136 includes advertisements, videos, images, music, web pages, email messages, SMS messages, content feeds, advertisements, coupons, playlists, XML documents, and ratings associated with various media content or any combination thereof. In some implementations, the content database 136 includes links to advertisements, videos, images, music, web pages, email messages, SMS messages, content feeds, advertisements, coupons, playlists, XML documents and ratings associated with various media content. In some implementations, the content database 136 is a distributed database.

In some implementations, the media monitoring server 130 includes user a comment processing module 131. In operation, the user comment processing module 131 transmits synchronization data and social network post templates to client devices (e.g. client device 120) via the front end server 134. In some instances, depending on the users, the user comment processing module 131 receives one or more comments regarding a broadcast media program, in the form of one or more electronic messages, from one or more client devices (e.g. client device 120) via the front end server 134. The user comment processing module 131 parses each received electronic message to determine what a particular user has selected as a post, and then generates the post according to the determined user selection. A more detailed exampled is described further below with reference to FIGS. 5-9.

In some implementations, the broadcast system 140 includes media content such as TV programs 141. In other words, the broadcast system 140 includes electronic copies of the media content. In some implementations, the broadcast system 140 also includes metadata 142 associated with one or more of the TV programs 141, and application program interface instructions 143. In some implementations, the application program interface instructions 143 include instructions that can be provided to a client device and/or may be executed by the broadcast system 140 under a client-server model or the like in order to link a particular TV program 141 with the associated metadata 142 and/or link the TV program 141 and the associated metadata 142 with external data and/or services, such as a social networking application. Similarly, in some implementations, the content provider 150 additionally and/or alternatively includes media content such as TV programs 151, as well as metadata 152 associated with one or more of the TV programs 151.

In some implementations, the social network server 170 includes profiles 171, which include profiles of users, brands, companies and/or groups.

Figure 2:
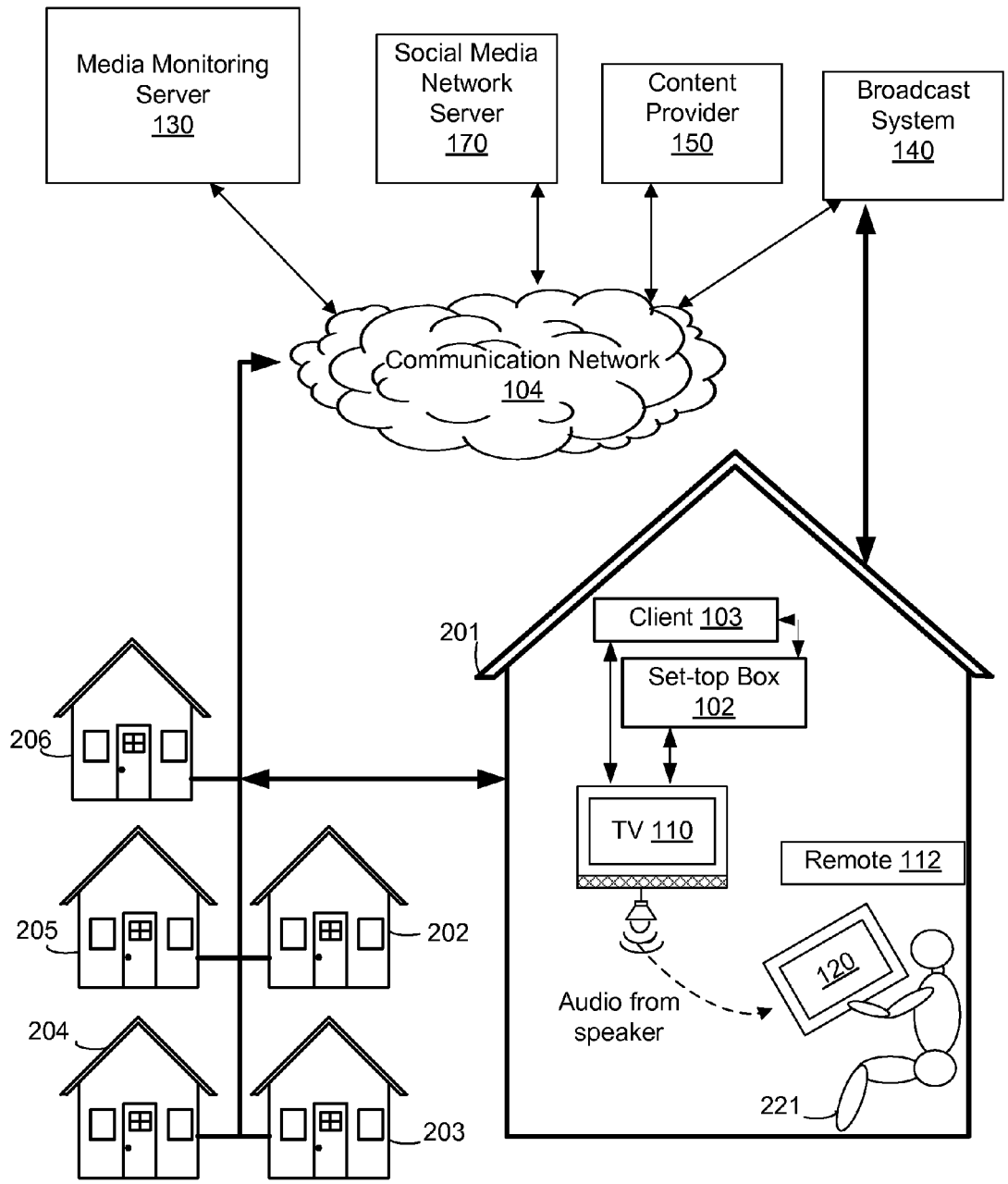
FIG. 2 is a block diagram of another example client-server environment.

FIG. 2 is a block diagram of another example client-server environment 200. The client-server environment 200 illustrated in FIG. 2 is similar to and adapted from the client-server environment 100 illustrated in FIG. 1. Elements common to both share common reference indicia, and only the differences between the client-server environments 100, 200 are described herein for the sake of brevity.

As a non-limiting example, within the client-server environment 200, the second screen client device 120 (e.g. a tablet computer or laptop, etc.), the set-top box 102, the TV 110, an additional client device 103, and a remote control 112 are provided in combination. In operation, the remote control 112 may be used to control the operation of one or more of the set-top box 102, the TV 110, and the additional client device 103. In operation, the client device 103 receives information from the set-top box 102 associated with the media content presented on the TV 110. In turn, the client device 103 may then communicate with any one of the media monitoring server 130, the broadcast system 140, the content provider 150, and the social network server 170 through the communication network 104. More specific details pertaining to how the client device 103 and/or the second screen client device 120 enables users to share and view comments about broadcast media programs as the media programs are aired.

Additionally, within the client-server environment 200, the set-top box 102, the client 103, the TV 110 and the second screen client device 120 are included in a first residential location 201. In operation, the set-top box 102 receives a TV signal or some other type of streaming video signal or audio signal. The set-top box 102 then communicates at least a portion of the received signal to the TV 110 for display to the user 221. As described above, the second screen client device 120 is configured to detect the media content playing on the first device (e.g. TV 110) and enable sharing of content-synchronized comments associated with the media content playing on the TV 110. Similar arrangements may be found within residential locations 202, 203, 204, 205 and 206, in which other users (not shown) similarly equipped can provide and share comments about the same media content. Moreover, while residential locations have been used in this particular example, those skilled in the art will appreciate from the present disclosure that client devices and the like can be located in any type of location, including commercial, residential and public locations. More specific details pertaining to how content-synchronized comments are shared amongst users are described below with reference to the remaining drawings and continued reference to FIGS. 1 and 2.

Figure 3:
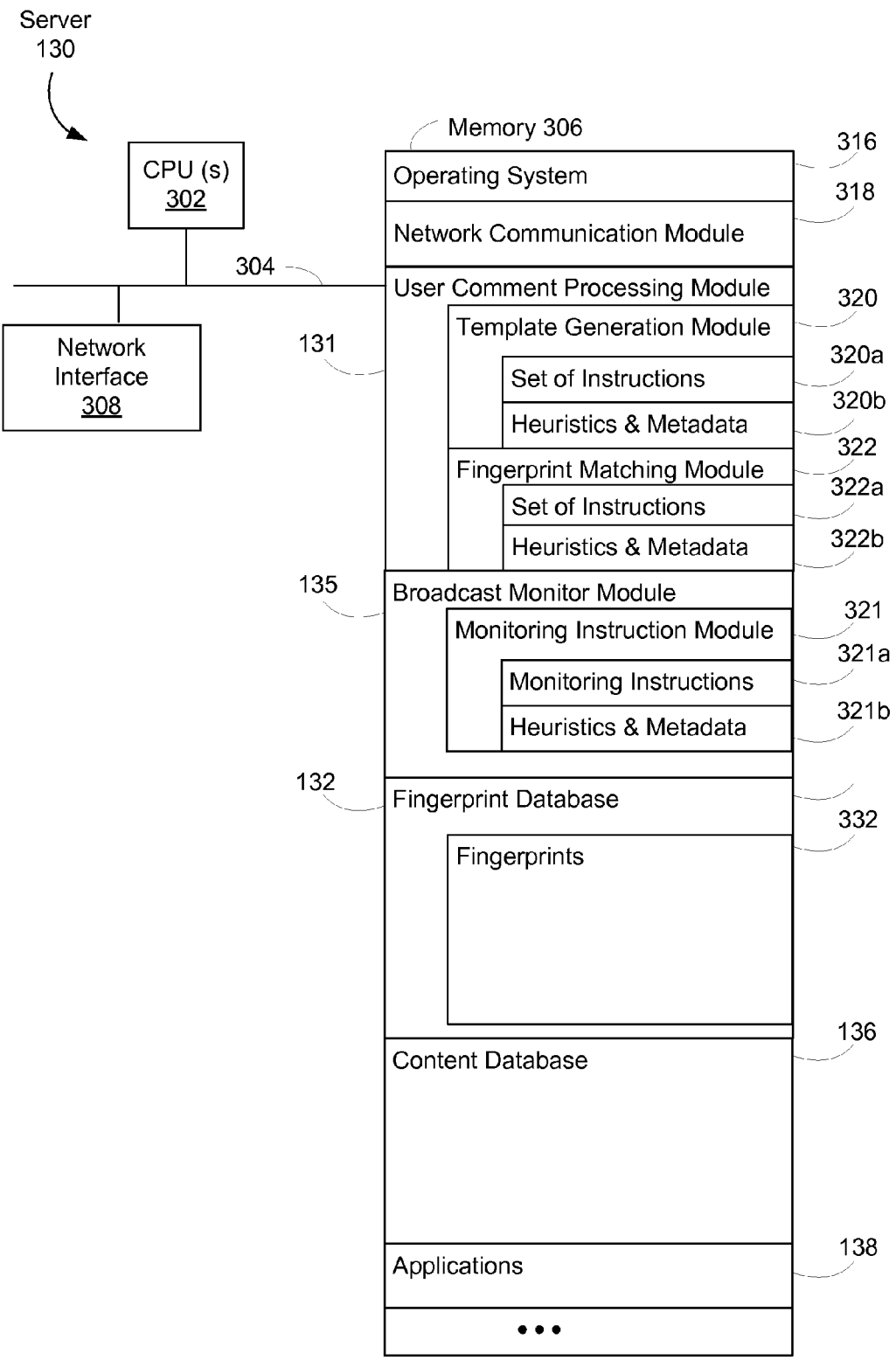
FIG. 3 is a block diagram of an example implementation of a server system.

FIG. 3 is a block diagram of an example implementation of the server system 130 discussed above with reference to FIGS. 1 and 2. While certain specific features are illustrated, those skilled in the art will appreciate from the present disclosure that various other features have not been illustrated for the sake of brevity and so as not to obscure more pertinent aspects of the implementations disclosed herein. To that end, the server system 130 includes one or more processing units (CPU's) 302, one or more network or other communications interfaces 308, memory 306, and one or more communication buses 304 for interconnecting these and various other components. The communication buses 304 may include circuitry (sometimes called a chipset) that interconnects and controls communications between system components. The memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 202. The memory 306, including the non-volatile and volatile memory device(s) within the memory 306, comprises a non-transitory computer readable storage medium. In some implementations, the memory 306 or the non-transitory computer readable storage medium of the memory 306 stores the following programs, modules and data structures, or a subset thereof including an operating system 316, and a network communication module 318.

In some implementations, the memory 306 also includes virtual implementations of one or more of the modules discussed above with respect to FIG. 1, namely, the user comment processing module 131, the broadcast monitor module 135, the fingerprint database 132, and the content database. In some implementations, the user comment processing module 131, the broadcast monitor module 135, the fingerprint database 132, and the content database are each provided in a respective suitable combination of hardware, software and firmware that may be distinct from the memory 306.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the Internet, other wide area networks, local area networks, metropolitan area networks, and so on. With further reference to FIG. 1, the network communication module 318 may be incorporated into the front end server 134.

In some implementations, the broadcast monitor module 135 is configured to collect information about broadcast media programs from electronic program guides, the broadcast media programs during broadcast, and/or third party sources (e.g. Tribune Media Services). The broadcast monitor module 135 then stores the collected information in the program content database 136. In some implementations, the broadcast monitor module 135 also generates and stores fingerprints associated with various broadcast media programs in the fingerprint database 132. To those ends, in some implementations, the broadcast monitor module 135 includes a monitoring module 321, which includes a set of instructions 321a, and heuristics and metadata 321b.

As noted above, the fingerprint database 132 may be configured to store fingerprints 332 associated with various broadcast media programs, such as, but not limited to, TV programs. A fingerprint may include a name or other identifier, fingerprint audio information and/or fingerprint video information, and a list of associated files. The name identifies the respective content fingerprint. For example, the name could include the name of an associated television program, movie, or advertisement. In some implementations, the fingerprint audio information includes a fingerprint or other compressed representation of a clip (such as several seconds, minutes, or hours) of the audio content of a video stream or an audio stream. In some implementations, the fingerprint video information 338 includes a fingerprint of a clip (such as several seconds, minutes, or hours) of a video stream. Fingerprints 332 in the fingerprint database 132 are periodically updated.

As discussed above, in some implementations, the user comment processing module 131 is configured to utilize the fingerprint database 132 and content database 136 to determine what a particular user is watching from a received reference, and provide synchronization data and one or more social network post templates to the respective client device. To those ends, in some implementations, the user comment processing module 131 includes a template generation module 320 and a fingerprint matching module 322.

In some implementations, the template generation module 320 generates one or more social network post templates for a particular TV program. For example, as discussed in greater detail below, one or more of the social network post templates is associated with a distinguishable portion of a broadcast media program. To that end, the template generation module 320 includes a set of instructions 320a, and heuristics and metadata 320b.

In some implementations, the fingerprint matching module 322 is configured to identify the TV program a user is watching using a reference received from a corresponding client device and one or more of the fingerprints 332 stored in the fingerprint database 132. To that end, the fingerprint matching module 322 includes a set of instructions 322a, and heuristics and metadata 322b.

Figure 4:
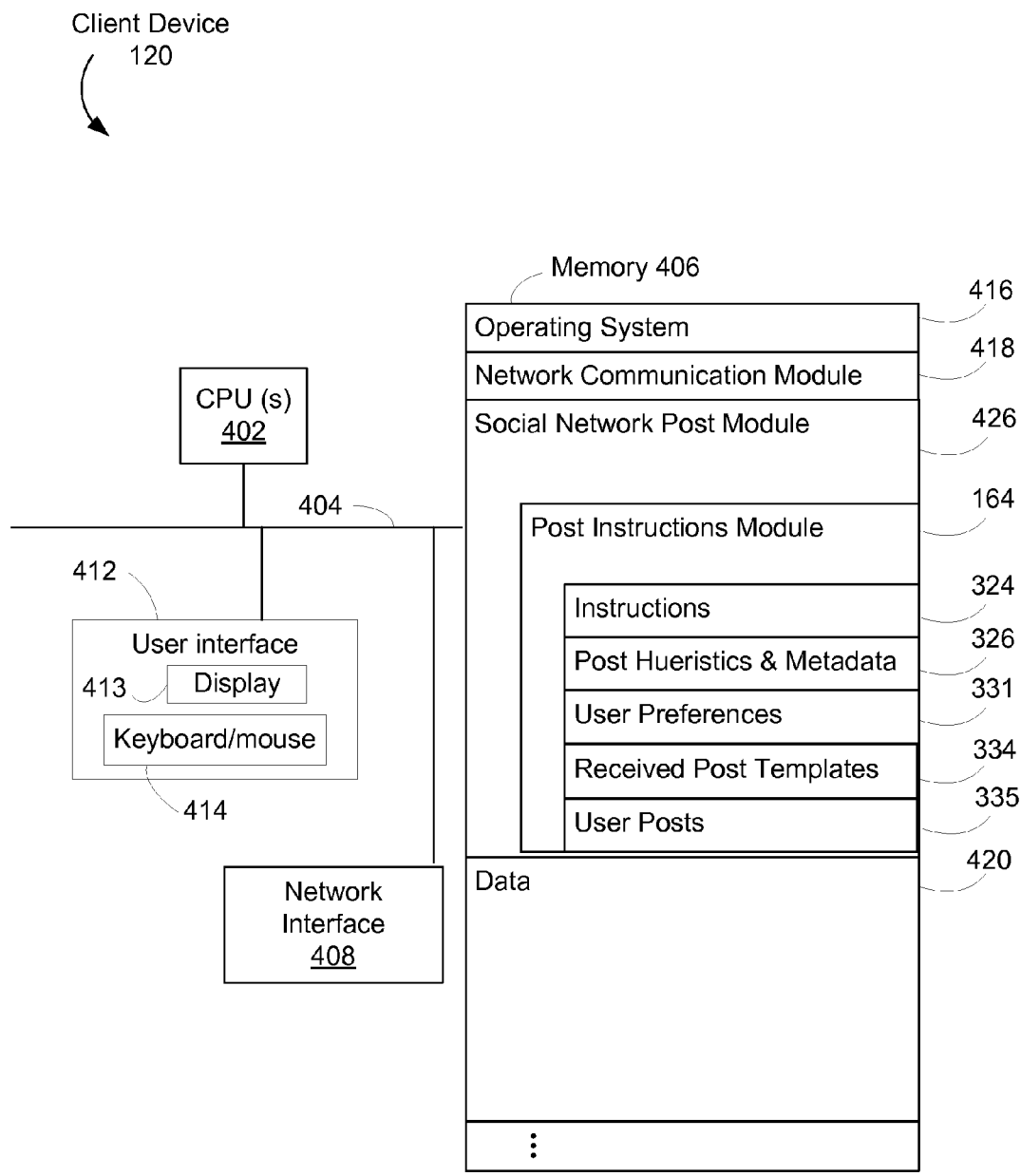
FIG. 4 is a block diagram of an example implementation of a client device.

FIG. 4 is a block diagram of an example implementation of the client device 120 discussed above with reference to FIGS. 1 and 2. While certain specific features are illustrated, those skilled in the art will appreciate from the present disclosure that various other features have not been illustrated for the sake of brevity and so as not to obscure more pertinent aspects of the implementations disclosed herein. To that end, the client device 120 includes one or more processing units (CPU's) 402, one or more network or other communications interfaces 408, memory 406, and one or more communication buses 404, for interconnecting these and various other components. The communication buses 404 optionally include circuitry (sometimes called a chipset) that interconnects and controls communications between system components. The client device 120 may also include a user interface comprising a display device 413 and a keyboard and/or mouse (or other pointing device) 414 and/or a remote control (etc.). Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively the non-volatile memory device(s) within memory 406, comprises a non-transitory computer readable storage medium. In some implementations, memory 406 or the computer readable storage medium of memory 406 store the following programs, modules and data structures, or a subset thereof including operation system 416, network communication module 418, a social network post module 426 and data 420.

The operating system 416 includes procedures for handling various basic system services and for performing hardware dependent tasks.

The network communication module 418 facilitates communication with other devices via the one or more communication network interfaces 404 (wired or wireless) and one or more communication networks, such as the Internet, other wide area networks, local area networks, metropolitan area networks, and so on.

In some implementations, the social network post module 426 enables a client device to interact with a social networking application. To that end, the social network post module 426 includes a post instructions module 164. And the post instructions module 164 includes instructions 324, post heuristics and metadata 326, user preferences 331, received post templates 334 and user posts 335.

Each of the above identified elements may be stored in one or more of the previously mentioned memory devices, and each of the modules or programs corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 406 may store additional modules and data structures not described above.

Figure 5:
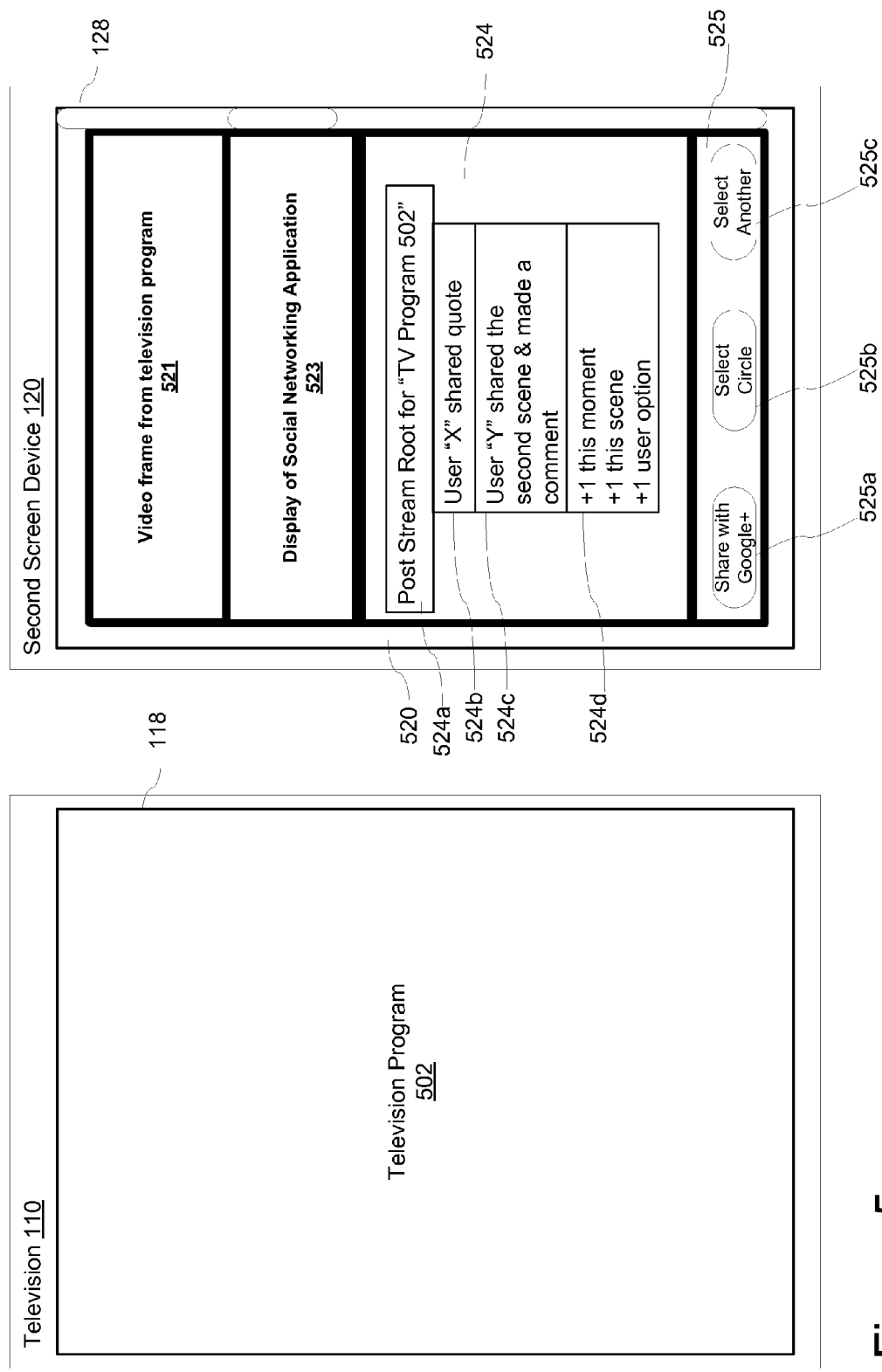
FIG. 5 is a schematic diagram of example screenshots according to some implementations.

With continued reference to FIGS. 1 and 2, FIG. 5 is a schematic diagram of example screenshots of the TV 110 and the second screen client device 120 according to some implementations. The display 118 of the TV 110 displays a television program 502 aired by a television network. While a TV is illustrated, those skilled in the art will appreciate from the present disclosure that the systems and methods disclosed herein may be used in combination with any media presentation device.

The display 128 of the second screen client device 120 displays a user interface 520 of the application 125 for acquiring, selecting and sharing content elements associated with the television program 502. In some implementations, the user interface 520 is configured to include four sections 521, 523, 524, 525. While four sections are included in the example implementation described with reference to FIG. 5, those skilled in the art will appreciate that a fewer or a greater number of sections may be included in a user interface according to various other implementations.

In some implementations, the first section 521 is configured to display an image associated with the television program 502 in order to indicate that the user interface 520 has been synchronized with the television program 502. For example, the first section 521 may display a recent screenshot (i.e. video frame) from the television program 502. Additionally and/or alternatively, a logo and/or a promotional image associated with the television program 502 may also be displayed.

In some implementations, the second section 523 is configured to display an image associated with a particular social networking application in order to indicate to the user that the user interface 520 is displaying content specifically associated with the social networking application. For example, the second section 523 may display a logo and/or a promotional image associated with the social networking application.

In some implementations, the third section 524 is configured to display a user interface the user may employ to select and customize social network post templates associated with the television program 502. In some implementations, the social network post templates are received from a server system. In some implementations, the social network post templates are local generated by a client application associated with a server system. The social network post templates allow users to share nuanced comments about particular portions or characteristics of a media program, such as for example, quotes, particular moments, characters, scenes, episodes, etc.

To that end, for example, the third section 524 displays the post stream root 524a associated with the television program 502. In some implementations, the post stream root 524a may be displayed in response to the user searching for and selecting the post stream root 524a. In some implementations, the post stream root 524a may be displayed in response a client application fingerprinting the television program 502 and requesting the post stream root 524a from a social networking server without engaging the user.

The post stream root 524a may be associated with one or more user micro-posts. In the example depicted in FIG. 4, at least two user micro-posts 524b, 524c are associated with the post stream root 524a. As discussed above, in some implementations, user micro-posts associated with a broadcast media program (e.g. television program 502) are enriched or supplemented prior to display by the social networking service. For example, the first micro-post 524b includes a quote. The second micro-post 524c includes a link to a vide snippet of the second scene of the program 502 and a comment from the user "Y".

Additionally, options to add to the post stream root 524a are displayed as an addendum 524d that includes links to one or more social network post templates (e.g. "+1 this moment" or "+1 this scene"). In some implementations, the addendum 524d is only displayed in the user interface 520 on the client device 120 (or the like), and not in the actual post stream as viewed via the social networking server directly. In some implementations, the addendum 524d may be visible at the end of a post stream even when the post stream is viewed via the social networking server directly.

In some implementations, the fourth section 525 is configured to display a number of selectable commands associated with using the social networking application. In some implementations, each selectable command is displayed in an icon or button or the like. For example, the fourth section 525 includes three selectable command buttons 525a ("Share with Google+"), 525b ("Select Circle"), 525c ("Select Another"). In some implementations, the selectable commands are commands that have historically been or are expected to be frequently chosen by a significant number of users using the application. In some implementations, the third section 525 is configured to allow a user to select one or more of the selectable commands by at least one of using a peripheral device, such as a mouse or keyboard, and/or by touching the display 128 if it is enabled as a touch-screen display.

Figure 6:
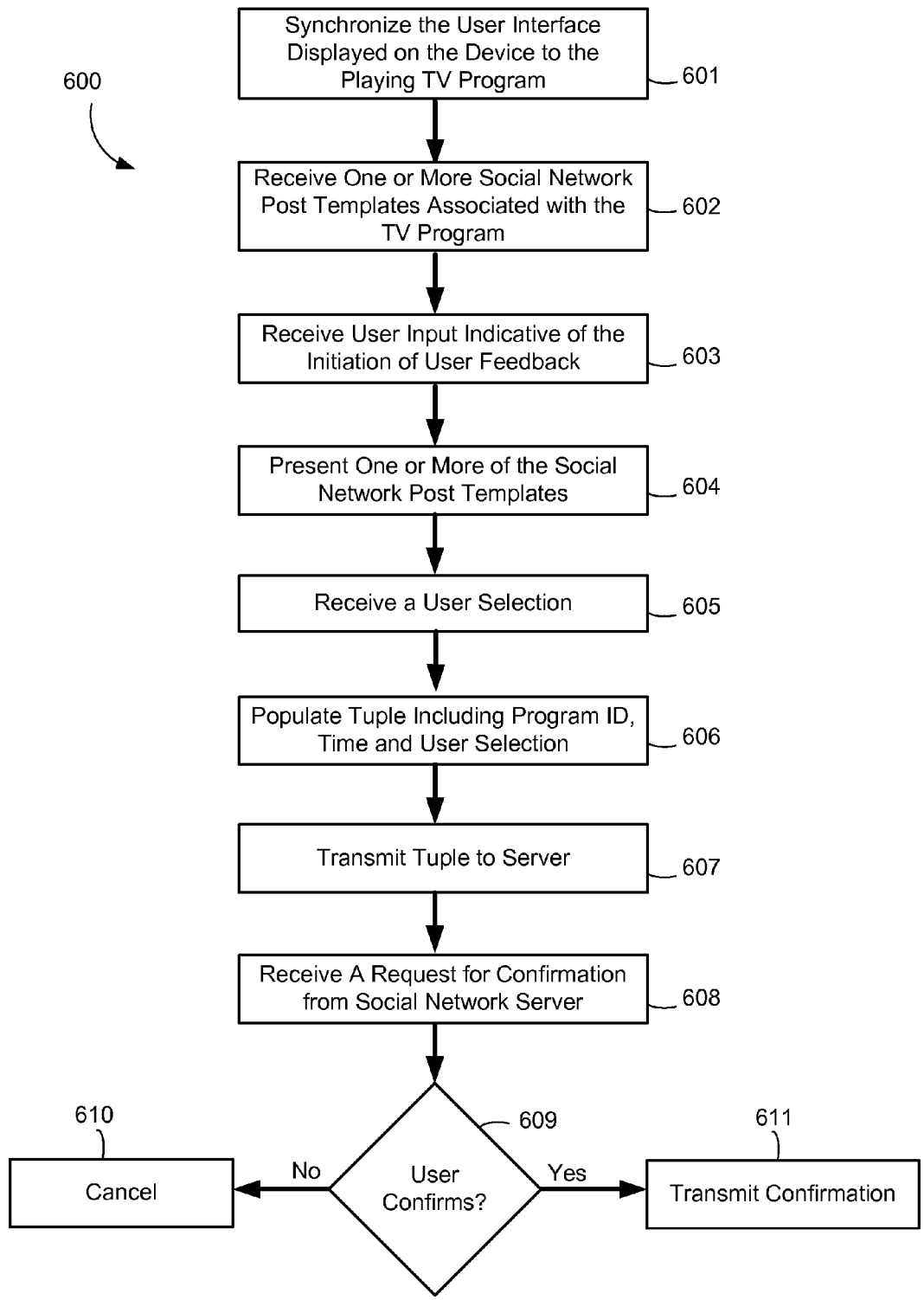
FIG. 6 is a flowchart representation of an implementation of a client device method.

FIG. 6 is a flowchart 600 of an implementation of a client device method. In some implementations, the method is performed by an application module, such as the social network post module 426 of FIG. 4 discussed above, operating on a client device (e.g. smart-phone, tablet, laptop, personal computer, etc.) in order to display a user interface enabling a user to share and view comments related to the television program aired by a television network or station.

To that end, the method includes synchronizing the user interface displayed on the client device to the playing TV program (601). For example, in some implementations, synchronization includes generating a reference to the media content playing on the TV, transmitting the reference to a media monitoring server, receiving a time-marker associated with the playing media content in response, and adjusting a local timer using the received time-marker. In some implementations, the time-marker includes at least one of a value indicative of a time-offset between the start time of the media content and the portion thereof that was used to generate the transmitted reference, an absolute time value provided by a system clock maintained by the server and/or broadcast system, and a relative time value based on the a system clock time. In some implementations, a reference may include, among other information, fingerprints of the stored audio content, the audio content itself, portions/snippets of the audio content, fingerprints of the portions of the audio content, an audio recording of the playing media content, a video recording of the playing media content, and/or characteristic extracted from one of an audio or video recording of the playing media content.

The method 600 also includes receiving one or more social network post templates associated with the playing TV program (602). For example, the templates may include options to select and comment on a particular program moment, a character appearing in the program, a quote from the program, a scene in the program, an entire episode of the program, a user-defined duration of the program, the program generally and/or an advertisement aired during a TV network time-slot associated with the program.

The method 600 also includes receiving a user input indicative of the initiation of user feedback (603). In response, the method includes presenting one or more of the received social network post templates to the user in the user interface (604). In some implementations, the template social network posts can be modified by a user (to include additional commentary, links to other media, or the like) or a user can provide a wholly custom social network post by populating a field with text, image files, video snippets, and/or URLs. The method includes receiving a user selection and/or custom post (605). The method includes using the received user selection and/or custom post to populate a data structure (i.e. a tuple) that includes a program identifier and a time value (606). The time value may be one of a time value relative to the beginning of the TV program or the actual local time or another time value that allows the server system to determine the program moment that the feedback from the user can be associated with. The data structure is then transmitted to a server (607), such as the media monitoring server 130 discussed above. The media monitoring server then operates to publish the post via the social network server.

The method 600 also optionally includes receiving a request for confirmation from the social network server via the media monitoring server (608). The method 600 includes determining whether the user confirms, which may be done by tapping a displayed button or the like. If the user provides an input indicative of a confirmation (608—Yes), the method 600 includes transmitting a confirmation message to the social network server. On the other hand, if the user either fails to provide an input indicative of a confirmation or provides an input expressly denying confirmation (608—No), the method 600 includes cancelling the social network post.

Figure 7:
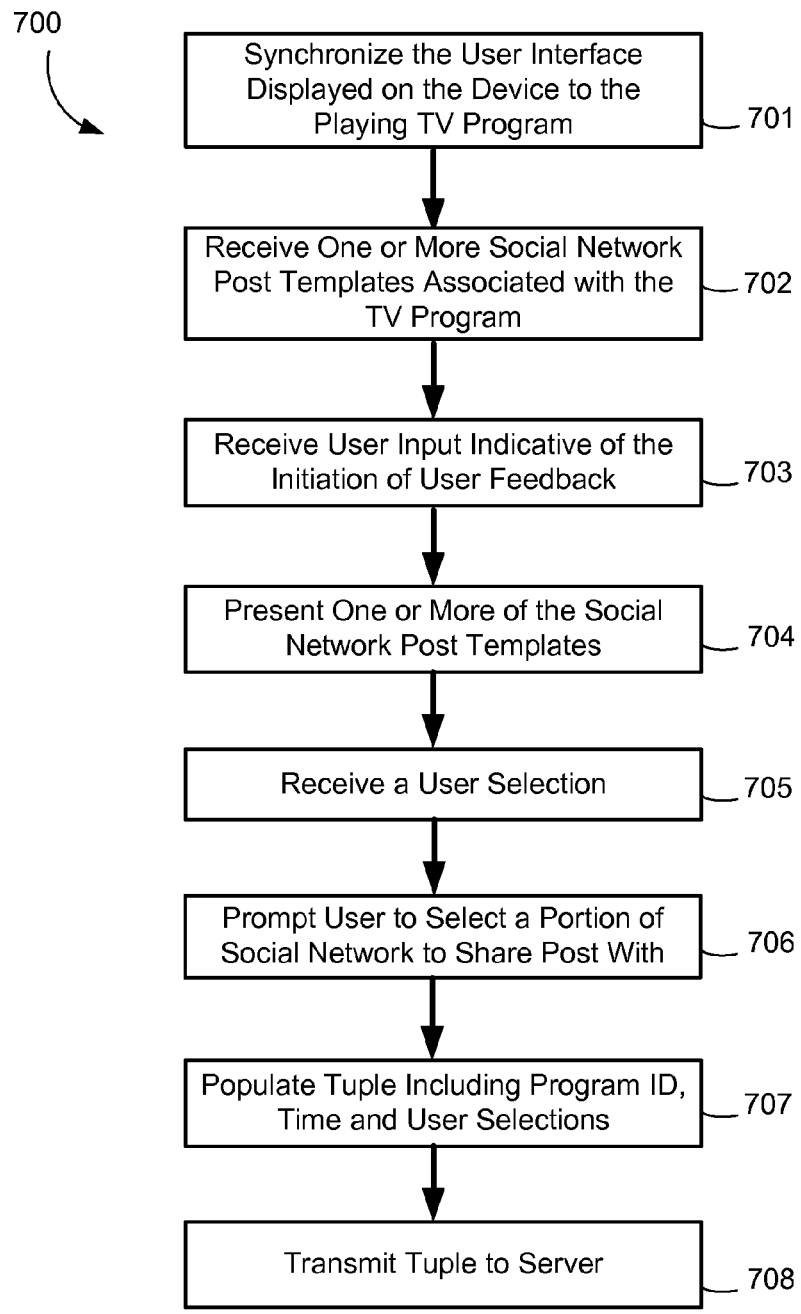
FIG. 7 is a flowchart representation of an implementation of another client device method.

FIG. 7 is a flowchart 700 of an implementation of another client device method. In some implementations, the method is performed by an application module, such as the social network post module 426 of FIG. 4 discussed above, operating on a client device (e.g. smart-phone, tablet, laptop, personal computer, etc.) in order to display a user interface enabling a user to share and view comments related to the television program displayed by the television network.

To that end, the method 700 includes synchronizing the user interface displayed on the client device to the playing TV program (701), and subsequently receiving one or more social network post templates associated with the playing TV program (702). As described above, the method 700 includes receiving a user input indicative of the initiation of user feedback (703). In response, the method includes presenting one or more of the received social network post templates to the user in the user interface (704). In some implementations, the template social network posts can be modified by a user (to include additional commentary, links to other media, or the like) or a user can provide a wholly custom social network post by populating a field with text, image files, video snippets, and/or URLs. The method includes receiving a user selection and/or custom post (705).

The method 700 also includes prompting the user to select a portion of the user's social network to share the post with (706). For example, a user may choose to share a post only with friends and family, and exclude colleagues at work that are in the user's network. The method 700 includes using the received user selection to populate a data structure (i.e. a tuple) that includes a program identifier, a time value, and an indicator to the portion of the social network the user selected (707).

The data structure is then transmitted to a server (708), such as the media monitoring server 130 discussed above. The media monitoring server then operates to publish the post via the social network server, after which a confirmation message or indicator may be sent to the client device.

Figure 8:
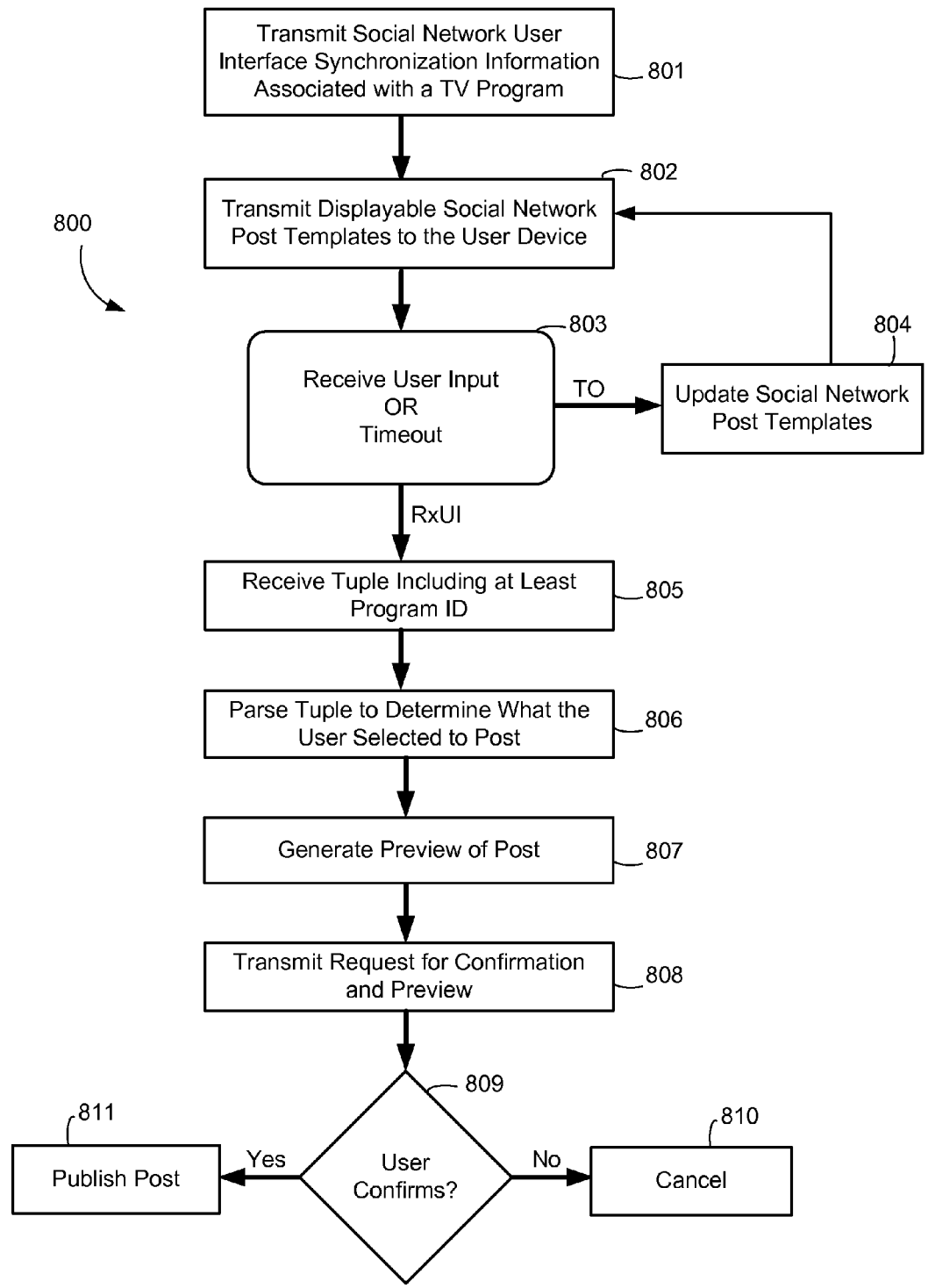
FIG. 8 is a flowchart representation of an implementation of a server system method.

FIG. 8 is a flowchart 800 of an implementation of a server system method. In some implementations, the method is performed by a user comment processing module operating on a server system in order to enable the sharing and viewing of user comments related to the television program displayed by the television network.

To that end, the method 800 includes transmitting synchronization information associated with a particular TV program to a client device (801), and also transmitting one or more social network post templates to the client device (802). The method 800 includes receiving a user input before a timer breaches a threshold (803). If the timer breaches the threshold (803—TO), the method includes updating the social network post template (804). For example, additional social network post templates may be generated based on the progression of the TV program, such as for example, scene changes or the arrival of an additional character. On the other hand, if user input is received by the module (803—RxUI), the method 800 includes receiving a data structure (i.e. tuple) including at least the program identifier (805). However, a typical data structure may also include a user selection and/or custom post. As such, the method 800 includes parsing the received data structure to determine what the user selected to post (806), and optionally generating a post preview (807).

If a post preview is generated, the method 800 also includes transmitting a request for confirmation along with the post preview to the client device (808). The method 800 includes determining whether the user has confirmed that the post should be published. If the user provides a response indicative of a confirmation (809—Yes), the method 800 includes publishing the post on the social network server (811). On the other hand, if the user either fails to provide a response indicative of a confirmation or provides a response expressly denying confirmation (809—No), the method 800 includes cancelling the social network post (810).

Figure 9:
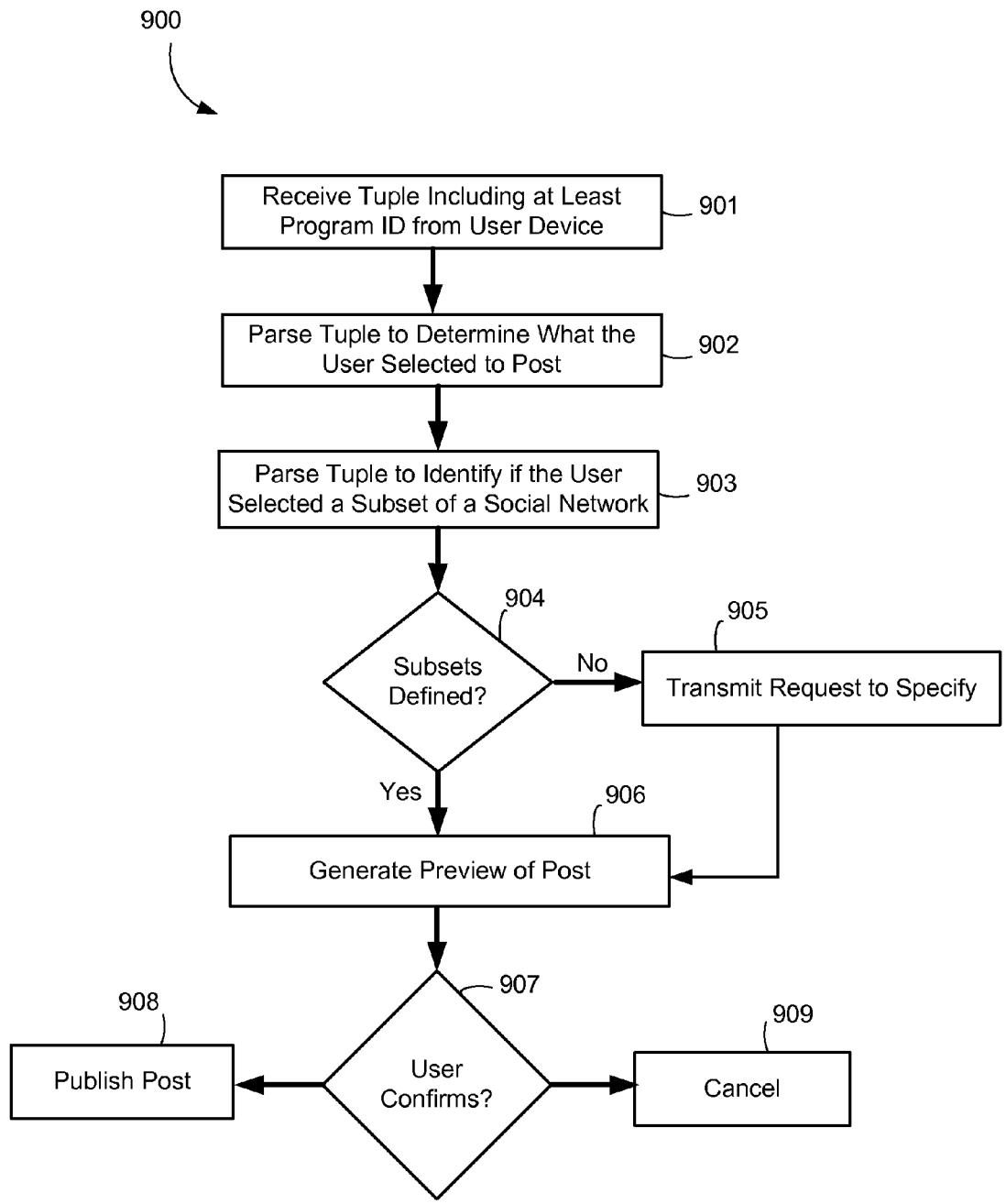
FIG. 9 is a flowchart representation of an implementation of another server system method.

FIG. 9 is a flowchart 900 of an implementation of another server system method. In some implementations, the method is performed by a user comment processing module operating on a server system in order to enable the sharing and viewing of user comments related to the television program displayed by the television network.

To that end, the method 900 includes receiving a data structure (i.e. tuple) including at least the program identifier (901). However, as noted above, a typical data structure may also include a user selection and/or custom post. As such, the method 900 includes parsing the received data structure to determine what the user selected to post (901), and to identify if the user selected a subset (i.e. a portion) of the user's social network with which to share the post (903).

As such, the method 900 includes determining whether the user has previously defined subsets within the user's social network. If the user's social network does not have previously defined subsets (904—No), the method include transmitting a request to specify and/or define subsets (905). On the other hand, if the user's social network includes previously defined subsets (904—Yes), the method includes generating and transmitting a post preview to the client device (906). In turn, the method 900 includes determining whether the user has confirmed that the post should be published. If the user provides a response indicative of a confirmation (907—Yes), the method 800 includes publishing the post on the social network server (908). On the other hand, if the user either fails to provide a response indicative of a confirmation or provides a response expressly denying confirmation (907—No), the method 800 includes cancelling the social network post (909).

Figure 10:
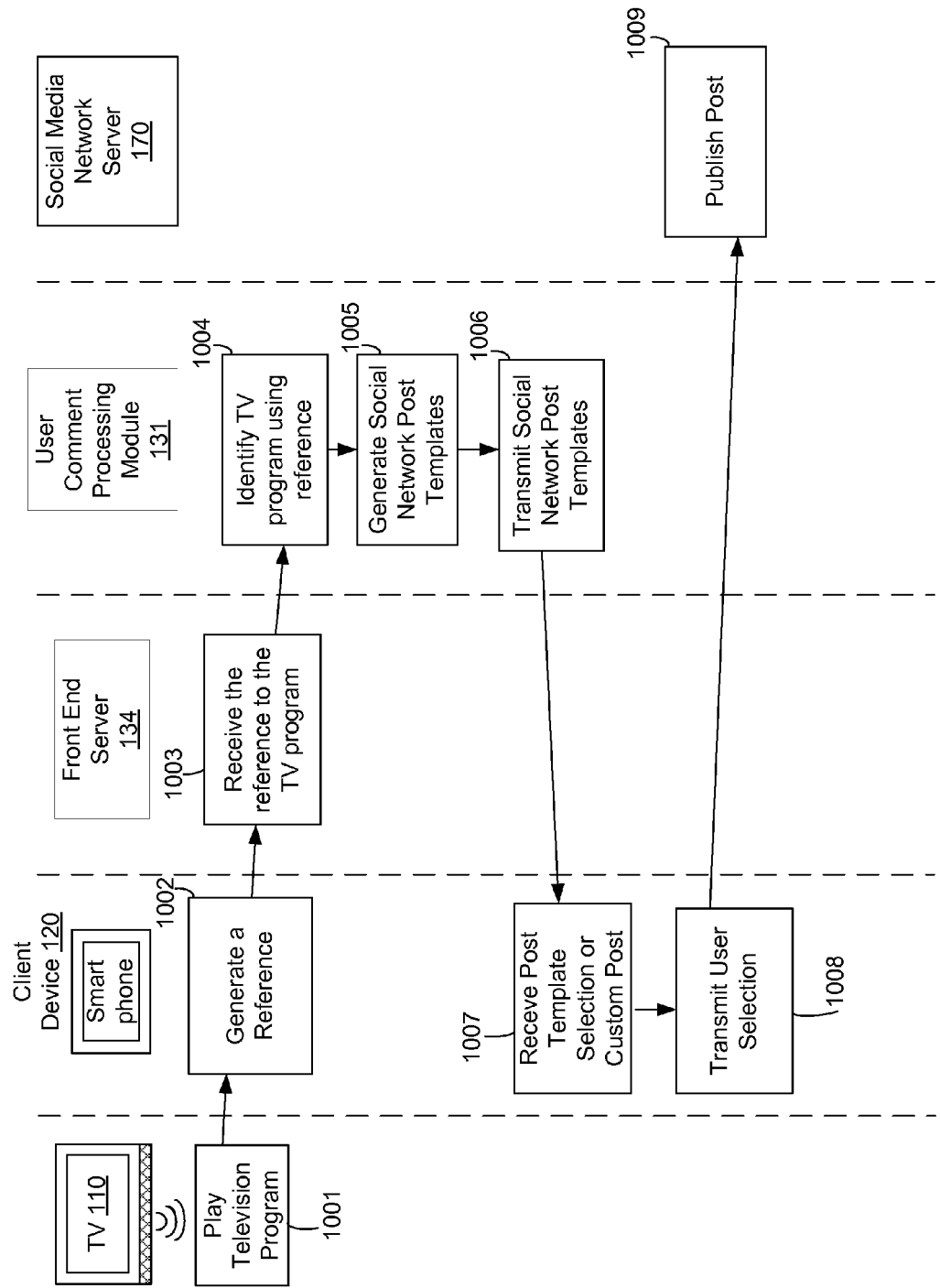
FIG. 10 is a signaling diagram representation of some of the transmissions between devices according to some implementations.

With further reference to FIGS. 1 and 2, FIG. 10 is a signaling diagram representation of some of the transmissions between components in the client-server environments 100/200. The client device 120 generates a reference (1002) to the TV program displayed/played by the TV 110 (1001). The reference is transmitted the client device 120 and is received by the front end server 134 (1003). Using the received reference, the user comment processing module 131 identifies the TV program (1004), generates social network post templates (1005), and transmits the social network post templates to the client device 120 (1006). In turn, the client device 120 displays at least one of the social network post templates in order to receive a social network post selection or a custom post (1007). The client device 120 then transmits the user selection to the social media network server 170 (1008), which publishes the post (1009).

As discussed above, users may chose to provide comments on portions of broadcast media programs. For example, a user may comment on particular portions such as quotes, scenes, moments, places shown or discussed within the program (e.g. the setting or location of a TV program), products shown or discussed within the program (e.g. product placements, etc.). In some implementations, various features both facilitate user annotations and comments, and enable organization of such annotations and comments.

Figure 11:
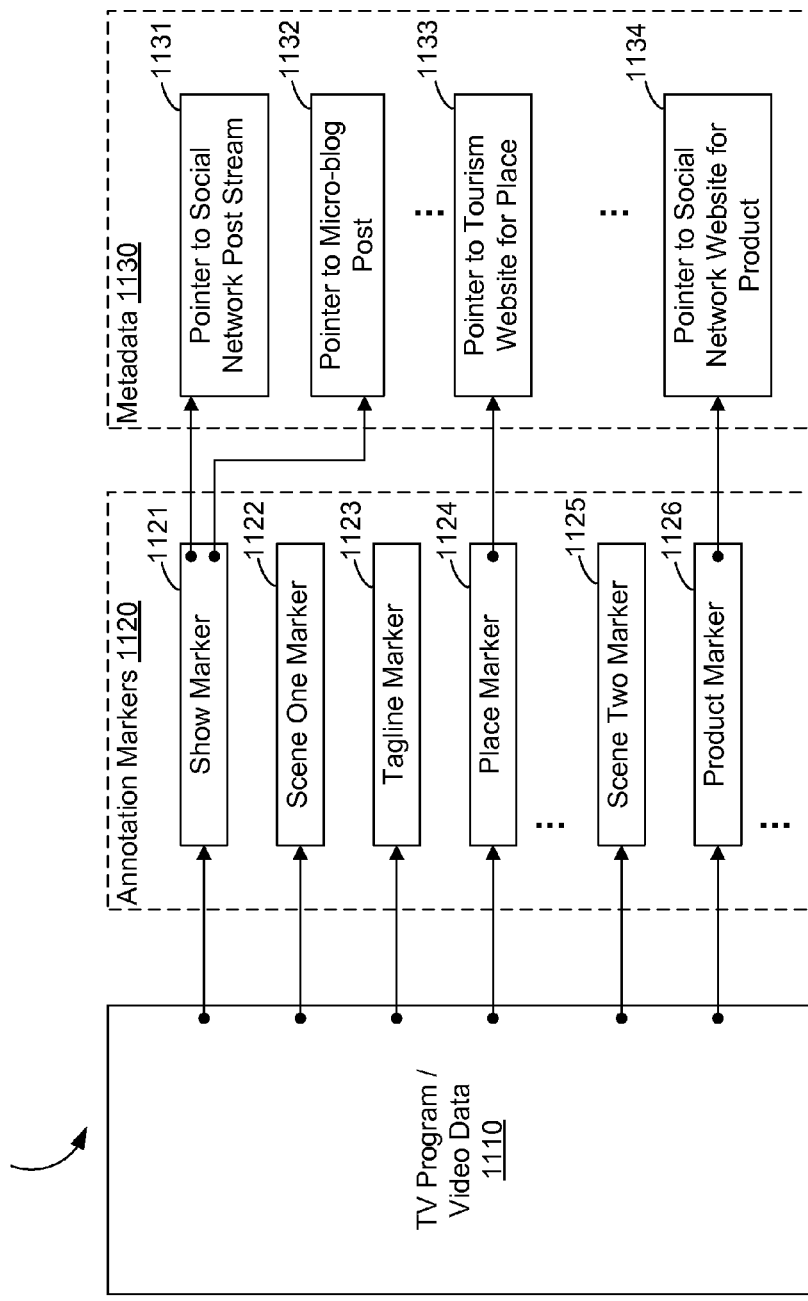
FIG. 11 is a schematic illustration of a data structure including annotation markers according to some implementations.

To that end, FIG. 11 is a schematic illustration of a data structure 1100 including annotation markers according to some implementations. The data structure 1100 includes TV program data 1110 (i.e. the video, audio and closed caption content that are typically included in a TV program), annotation marker 1120 and metadata 1130.

The annotation markers 1120 provide a program content indexing scheme that allows user annotations and comments to be organized and linked to the TV program 1110 data based on the organizational content of the TV program 1110. Additionally and/or alternatively, a content provider (e.g. a network) produces a TV show (e.g. sitcom) that includes digital markers (i.e. the annotation markers) that can be used to link user annotations and/or comments to the show on a social networking site or the like. In the context of a sitcom, the markers may be included at especially humorous portions of the show before the show is aired on the expectation that users will want to share that scene or even a quote in the scene with members of their social network. Alternatively, the markers can also be created while the program is airing in response to a number of users attempting to share the same portion of the show (e.g. a particularly skillful catch during a baseball game).

For example, the annotation markers 1120 include a show marker 1121, a scene one marker 1122, a tagline marker 1123, a place marker 1124, a scene two marker 1125, and a product market 1126.

The show marker 1121, for example, indexes annotations and/or comments generally associated with the TV program data 1110 as a whole. For example, the show marker 1121 is linked to metadata that provides a pointer 1131 to the social network post stream associated with the TV program, and a pointer 1132 to a particular micro-blog post associated with the TV program. Similarly, the scene one marker 1122, the tagline marker 1123 and the scene two marker 1125 may also be linked to metadata providing pointers to various user annotations and/or comments.

The place marker 1124, for example, is linked to metadata that provides a pointer 1133 to a tourism website associated with the location where a scene from the TV program takes place. Similarly, product marker 1126, for example, is linked to metadata that provides a pointer 1134 to a social network website providing consumer information about a particular product (e.g. the shoes that a character is wearing).

Figure 12:
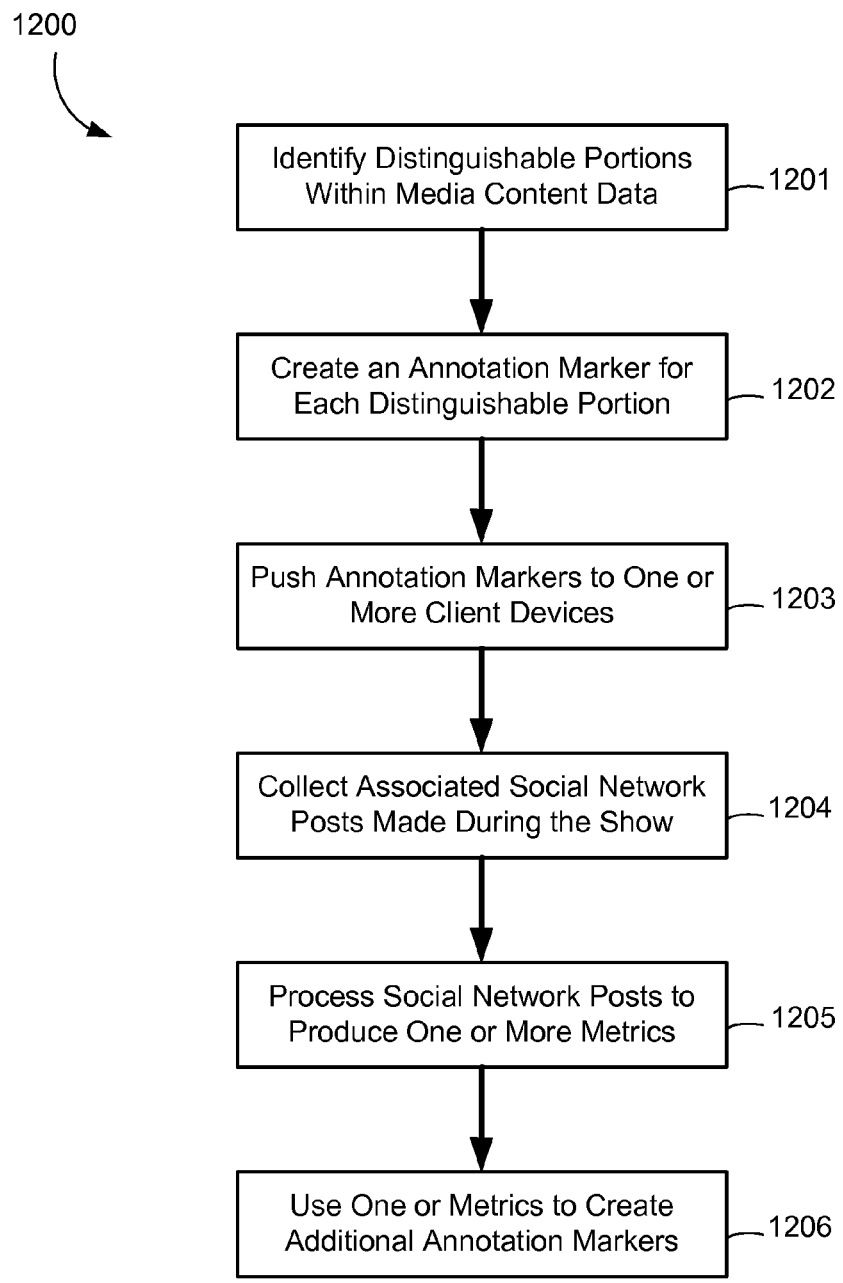
FIG. 12 is a flowchart representation of an implementation of another server system method.

FIG. 12 is a flowchart 1200 of an implementation of a method of a server system method. In some implementations, the method is performed by an application module, such as the broadcast monitor module 135 in FIG. 1, operating on a server system to generate one or more annotation markers associated with media content, such as a TV program.

To that end, the method 1200 includes identifying distinguishable portions within media content data (1201). For example, the example of distinguishable portions include scenes, opening and closing credits, the arrival or departure of characters, the presence of overlaid laugh-tracks, etc. In other words, a distinguishable portion of the media content data is a separable and/or readily identifiable portion of the media content data. In turn, the method 1200 includes creating an annotation marker for one or more of the identified distinguishable portions within media content data (1202). The method 1200 also includes pushing one or more of the annotation markers to one or more client devices.

While a particular program is being broadcast, the method 1200 includes collecting social network posts associated with the particular program (1204), and generating one or metrics that characterize the posts. For example, the metrics may include the frequency of posts throughout the program or during successive intervals. In turn, the one or more metrics may be used to create new annotation markers or update existing annotation markers. For example, a new annotation marker may be created for a particular moment during the program at which a number of users created a social network post.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method of generating a social network post in a post stream associated with a particular broadcast media program, the method comprising:
   receiving by a second screen device a portion of the particular broadcast media program played on a first screen device in proximity to the second screen device;
   sending a reference associated with the received portion of the particular broadcast media program to a server for identifying the particular broadcast media program;
   receiving from the server a time marker associated with the particular broadcast media program, the time marker including at least one of a value indicative of a time-offset between the start time of the particular broadcast media program and the portion thereof that was used to generate the sent reference, an absolute time value provided by a system clock maintained by the server, and a relative time value based on the system clock time;

adjusting a local timer using the time marker;

synchronizing the user interface displayed on the second screen device to the post stream associated with the identified particular broadcast media program, wherein the post stream includes a sequence of micro-posts associated with the identified particular broadcast media program;

displaying on the second screen device one or more social network post templates associated with the identified particular broadcast media program, wherein the one or more social network post templates are based on one or more predefined micro-posts associated with the particular broadcast media program;

enabling user selection of at least one of the displayed social network post templates;

receiving an input that is an indication of a user selection of at least one of the social network post templates; and transmitting the indication of the user selection to a social network server for publication in the post stream associated with the particular broadcast media program.

2. The method of claim 1, further comprising receiving a user input, wherein the input is indicative of at least the initiation of user feedback associated with the particular broadcast media program, and wherein the one or more social network post templates are displayed in response to receiving the user input.

3. The method of claim 1, further comprising receiving at least one social network post template, wherein each social network post template is associated with at least a portion of the particular broadcast media program.

4. The method of claim 3, wherein a portion of the particular broadcast media program includes at least one of an entire episode of the particular broadcast media program, an advertisement that aired during a showing of the particular broadcast media program, a scene, a moment, a quote or a user defined duration of the particular broadcast media program.

5. The method of claim 3, wherein at least one portion of the particular broadcast media program is associated with a marker, wherein the marker includes data that enables the user device to associate the at least one portion of the particular broadcast media program to a social network post template.

6. The method of claim 1, wherein at least one of the social network post templates is customizable.

7. The method of claim 1, wherein synchronizing the user interface displayed on the second screen device to the post stream associated with the particular broadcast media program includes the second screen device displaying the post stream associated with the particular media program.

8. The method of claim 1, further comprising:
recording the portion of the particular broadcast media program as it is playing on the first screen device using a microphone of the second screen device; and
providing the reference of the recorded portion of the particular broadcast media program to the server for identifying the particular broadcast media program.

9. The method of claim 1, wherein synchronizing the user interface displayed on the second screen device to the post stream associated with the particular broadcast media program includes:
receiving displayable content from a server, the displayable content including a selectable portion;
displaying the content in the user interface on the second screen device;
receiving a user input indicative of the selection of the selectable portion; and
transmitting the user indication to the server.

10. The method of claim 9, wherein the user interface includes at least one of a user device application or a web browser.

11. The method of claim 1, further comprising generating a data structure including the indicator of the selection, wherein the indicator is transmitted to the social network server within the data structure.

12. The method of claim 11, wherein the data structure also includes at least one of a program identifier associated with the particular broadcast media program, a time value or an indicator of a portion of a social network associated with a particular user that may view the associated post, the portion of the social network including at least one other user.

13. The method of claim 1, further comprising:
receiving a request for confirmation associated with the selected social network post;
prompting a user to provide a confirmation indication; and
receiving an indication that either confirms or denies publishing the selected social network post.

14. A method of generating a social network post in a post stream associated with a particular broadcast media program, performed at a server, the method comprising:
receiving from a second screen device a reference associated with a portion of the particular broadcast media program played on a first screen device, wherein the portion of the particular broadcast media program is received by the second screen device in proximity to the first screen device;
identifying the particular broadcast media program using the received reference;
transmitting to the second screen device a time marker associated with the particular broadcast media program, the time marker including at least one of a value indicative of a time-offset between the start time of the particular broadcast media program and the portion thereof that was used to generate the received reference, an absolute time value provided by a system clock maintained by the server, and a relative time value based on the system clock time at the server;
adjusting a local timer using the timer marker;
transmitting synchronizing data and instructions to the second screen device, wherein the synchronizing data and instructions enable the second screen device to synchronize a social network user interface displayable by the second screen device to the post stream associated with the particular broadcast media program, and wherein the post stream includes a sequence of micro-posts associated with the identified particular broadcast media program;
transmitting one or more displayable social network post templates to the second screen device, wherein the one or more displayable social network post templates are based on one or more predefined micro-posts associated with the particular broadcast media program;
receiving an indication of a social network post selection from the second screen device within a threshold time; and
publishing the social network post selection in the post stream associated with the particular broadcast media program.

15. The method of claim 14, further comprising receiving a user input from the second screen device, wherein the input is indicative of at least the initiation of user feedback associated with the particular broadcast media program, and wherein the synchronizing data and instructions are transmitted in response to receiving the user input.

16. The method of claim 15, further comprising:
receiving a recording of the portion of the particular broadcast media program from the user device; and
synchronizing at least portions of the recording against characteristics of one or more broadcast media programs to determine the program identity of the particular broadcast media program.

17. The method of claim 16, wherein the recording includes at least one of a raw recording of the particular broadcast media program or extracted characteristics of obtained from a raw recording of the particular broadcast media program by the reporting user device.

18. The method of claim 14, further comprising:
in response to a determination that no indication of the social network post selection from the second screen device is received within the threshold time, the threshold time being predetermined:
updating the one or more displayable social network post templates by generating additional social network post templates based on progression of the identified particular broadcast media program; and
transmitting the updated one or more displayable social network post templates to the second screen device.

19. The method of claim 18, wherein the one or more displayable social network post templates are updated at regular intervals or predefined intervals or at intervals dependent on the content of the particular broadcast media program or pseudo-randomly determined intervals.

20. The method of claim 14, wherein each social network post template is associated with at least a portion of the particular broadcast media program.

21. The method of claim 20, wherein the portion of the particular broadcast media program includes at least one of a scene, a moment, a quote or a user defined duration of the particular broadcast media program.

22. The method of claim 20, wherein at least one portion of the particular broadcast media program is associated with a marker, wherein the marker includes data that enables the user device to associate the at least one portion of the particular broadcast media program to a social network post template.

23. The method of claim 14, wherein at least one of the social network post templates is customizable.

24. The method of claim 14, wherein the synchronizing data and instructions include instructions that cause the second screen device to display the post stream associated with the particular broadcast media program.

25. The method of claim 14, wherein the synchronizing data and instructions include:
displayable content, the displayable content including a selectable portion; and
instructions for:
displaying the content in a user interface on the second screen device;
receiving a user input indicative of the selection of the selectable portion; and
transmitting the user indication to the server.

26. The method of claim 14, wherein receiving the indication of the social network post selection from the second screen device includes receiving a data structure including the indication of the selection, wherein the indication is transmitted to the social network server within the data structure.

27. The method of claim 26, wherein the data structure also includes at least one of a program identifier associated with the particular broadcast media program, a time value or an indicator of a portion of a social network associated with a particular user that may view the associated post, the portion of the social network including at least one other user.

28. The method of claim 26, further comprising:
parsing the data structure to identify the indication of the selection;
identifying what portion of the particular broadcast media program is associated with the indication; and
generating or updating post selection based on what portion of the particular broadcast media program was identified as being associated with the indication.

29. The method of claim 27, further comprising:
parsing the data structure to identify the indication of the portion of the social network associated with a particular user that may view the associated post, and
wherein the social network post selection is published so that the portion of the social network associated with the particular user may view the associated post.

\* \* \* \* \*